United States Patent [19]

Wireman

[11] Patent Number: 4,875,914
[45] Date of Patent: Oct. 24, 1989

[54] GAS & ODOR ADSORBING UNIT

[76] Inventor: Wallace Wireman, 113 Park Ave., Walton, Boone Cty., Ky. 41094

[21] Appl. No.: 326,192

[22] Filed: Mar. 20, 1989

[51] Int. Cl.⁴ .............................................. B11D 53/04
[52] U.S. Cl. .......................................... 55/389; 55/33; 55/68; 55/73; 55/75; 55/387; 55/471; 55/472
[58] Field of Search .................... 55/33, 68, 73, 74, 75, 55/387, 389, 471, 472; 210/282

[56] References Cited

U.S. PATENT DOCUMENTS

| | | | |
|---|---|---|---|
| 3,308,610 | 3/1967 | Springer et al. | 55/471 X |
| 3,501,897 | 3/1970 | Van Hellen et al. | 55/73 |
| 4,659,467 | 4/1987 | Spearman | 210/282 |

Primary Examiner—Charles Hart
Attorney, Agent, or Firm—Frost & Jacobs

[57] ABSTRACT

An improved gas and odor absorbing unit. The unit comprises a container having a bed of particulate odor and gas absorbing material therein constituting a molecular sieve. A tubular passage extends through the container and bed and is provided with a perforated peripheral wall adjacent the bed. The bed is fully enclosed except at the perforated tube wall. Air containing moisture, gases and odors is directed through the tubular passage. The molecular sieve bed has an affinity for gases and odors and an affinity for moisture as well. By directing the air through the tubular passage, rather than directly through the bed itself, more of the gases and odord and less moisture will be absorbed by the bed, increasing the working life of the bed. This effect may be further improved if the tubular passage is provided with diffuser material such as baffles, polyester, or fiberglass to slow down and disperse the air passing therethrough. The molecular sieve bed preferably contains indicator particles which change color when the bed needs to be changed. To this end, the container is preferably transparent allowing visual inspection of the bed. The unit can be either static or dynamic, depending upon whether air is directed through the tubular passage by the flue effect or by fan means.

17 Claims, 5 Drawing Sheets

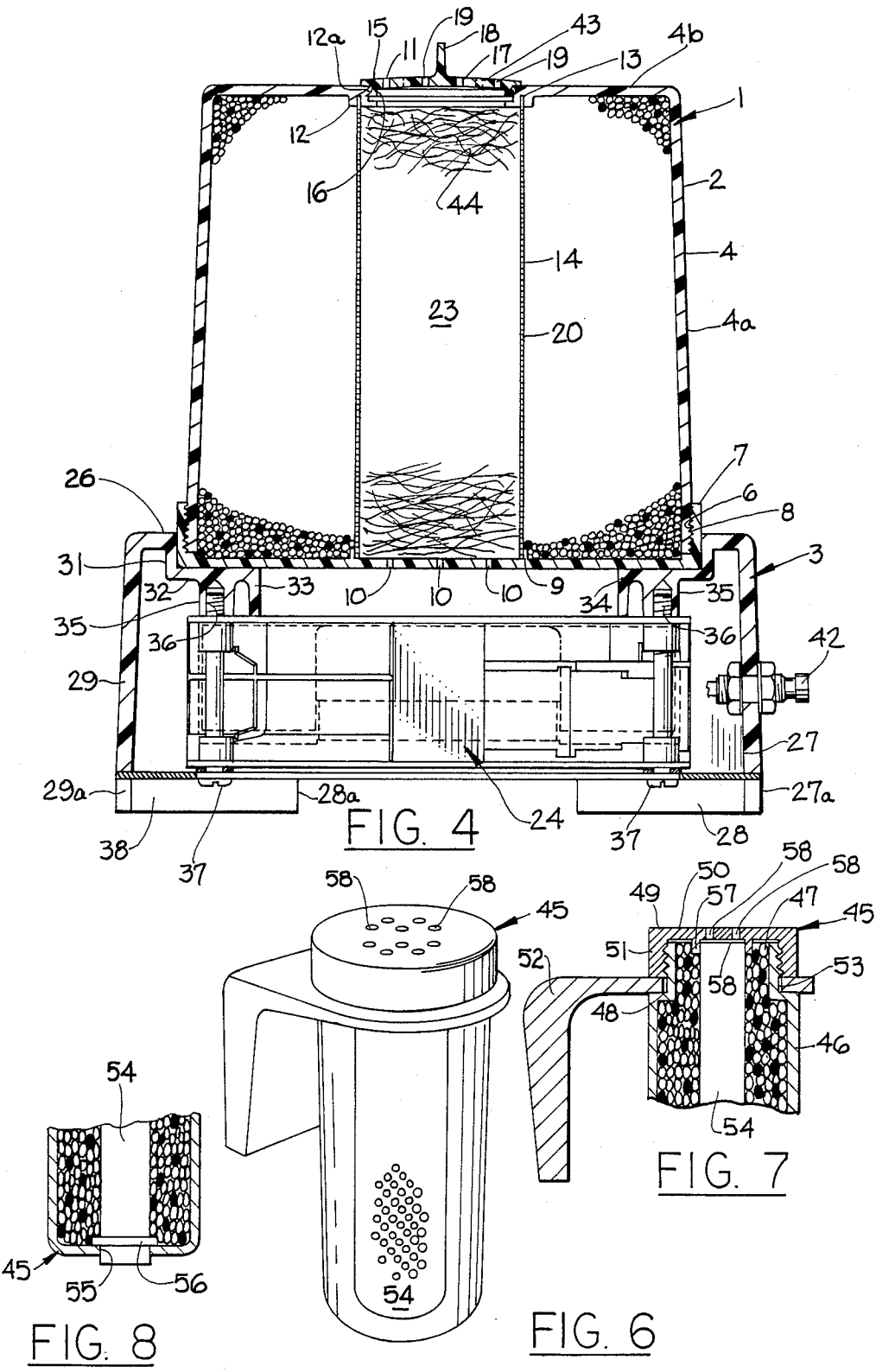

4,875,914

GAS & ODOR ADSORBING UNIT

TECHNICAL FIELD

The invention relates to a unit for adsorbing gases and odor from the ambient atmosphere utilizing a container or canister filled with molecular beads constituting a molecular sieve, and more particularly to such a unit wherein the container and molecular sieve bed therein have a passage extending therethrough, through which the ambient atmosphere is directed, the passage being defined by a foraminous wall through which the bed is exposed to the atmosphere.

BACKGROUND ART

It is well known that a bed of molecular beads (constituting a molecular sieve) in a container will adsorb gases and odors from air forced through the container and the molecular sieve bed. The gases and odors are pulled down inside the minute pores of the molecular beads. The gas and odor molecules have a critical diameter rated from two to ten angstroms. By selecting an appropriate molecular sieve (for instance a three A, four A, five A, or ten A molecular sieve, or a mixture of such molecular sieves), different undesirable gases and odors can be adsorbed.

A problem arises when forcing air through a molecular sieve bed to remove gases and odors. This problem is based on the fact that the molecular beads of the bed also have an affinity for moisture. Moisture in the air being filtered will first collect on the surfaces of the beads, and will thereafter work its way into the bead pores. Moisture in the bead pores reduces the amount of gases and odors that can be drawn into the pores and therefore reduces the working life of the molecular sieve.

The present invention is based upon the discovery that, if a central passage is provided through the molecular sieve bed and its container, and if the passage is defined by at least one foraminous wall exposing the molecular sieve bed to air flowing through the passage, gases and odors from the flowing air will be drawn into the pores of the molecular sieve, with far less moisture being adsorbed by the molecular sieve than when the air to be filtered is passed directly through the molecular sieve bed. Since the bulk of the moisture in the air to be filtered flows on through the passage, the working life of the molecular sieve, for the removal of gases and odors, is markedly increased.

While good results are achieved in a static version of the unit wherein the air flows through the passage by the flue effect, for more rapid and efficient gas and odor removal, it is preferred to draw the air through the passage by means of a fan.

The passage may be open, or it may be filled with polyester, fiberglass, or baffle means to slow down or diffuse the air to allow and encourage the small gas and odor molecules to sort of "sling off" toward the openings in the foraminous wall of the passage.

An indicator material may be mixed in the molecular sieve which will change color when the adsorbing property of the molecular sieve has been spent, and the bed needs replacement. Under these circumstances, the container for the bed should be transparent so that the indicator can be viewed.

DISCLOSURE OF THE INVENTION

According to the invention, there is provided an improved gas and odor adsorbing unit for the removal of unwanted gases and odor from the ambient atmosphere. The unit comprises a container or canister having a bed of particulate odor and gas adsorbing molecular beads therein, constituting a molecular sieve. The molecular sieve bed and its container are provided with a tubular passage defined by a perforated peripheral wall adjacent the bed. The bed is fully enclosed except for the perforated tube wall. Air containing moisture, gases and odors is drawn through the tubular passage. The molecular sieve bed has an affinity for gases, odors and moisture in the air drawn through the passage. However, by drawing the air through the passage, rather than directly through the molecular sieve bed itself, more gases and odors and less moisture will be adsorbed by the bed, thus markedly increasing the working life of the bed.

This effect may be further improved if the passage is provided with diffuser material such as baffles, polyester, or fiberglass, to slow down and disperse the air passing therethrough.

The molecular sieve preferably contains indicator particles which change color when the adsorbing properties of the molecular sieve are spent. It is therefore desirable to provide a container for the molecular sieve made of transparent material, allowing visual inspection of the bed and replacement thereof when the indicator particles have changed color.

While the ambient air may be drawn through the passage of the unit by the flue effect, it is preferable that a small fan be provided in the unit for this purpose. This enables more rapid and efficient pickup of gases and odors, although the molecular sieve will be spent more rapidly.

The molecular sieve will be chosen for its pore sizes, depending upon the diameter of the gas and odor molecules to be adsorbed.

The gas and odor adsorbing unit of the present invention can be made as a portable unit to be carried on the person of the user.

BRIEF DESCRIPTION OF THE DRAWINGS

FIG. 4 is a cross-sectional view taken along section line 4—4 of FIG. 3.

FIG. 6 is a perspective view of another embodiment of the present invention.

FIG. 7 is a fagmentary cross sectional view of the upper portion of the unit of FIG. 6.

FIG. 8 is a fragmentary cross sectional view of the bottom portion of the unit of FIG. 6.

DETAILED DESCRIPTION OF THE INVENTION

In order to describe the nature of the invention, reference is made to FIGS. 1–5 wherein an exemplary embodiment of the present invention is illustrated. The unit of FIGS. 1–5 is generally indicated at 1 and is a table-top unit.

Figure 1:
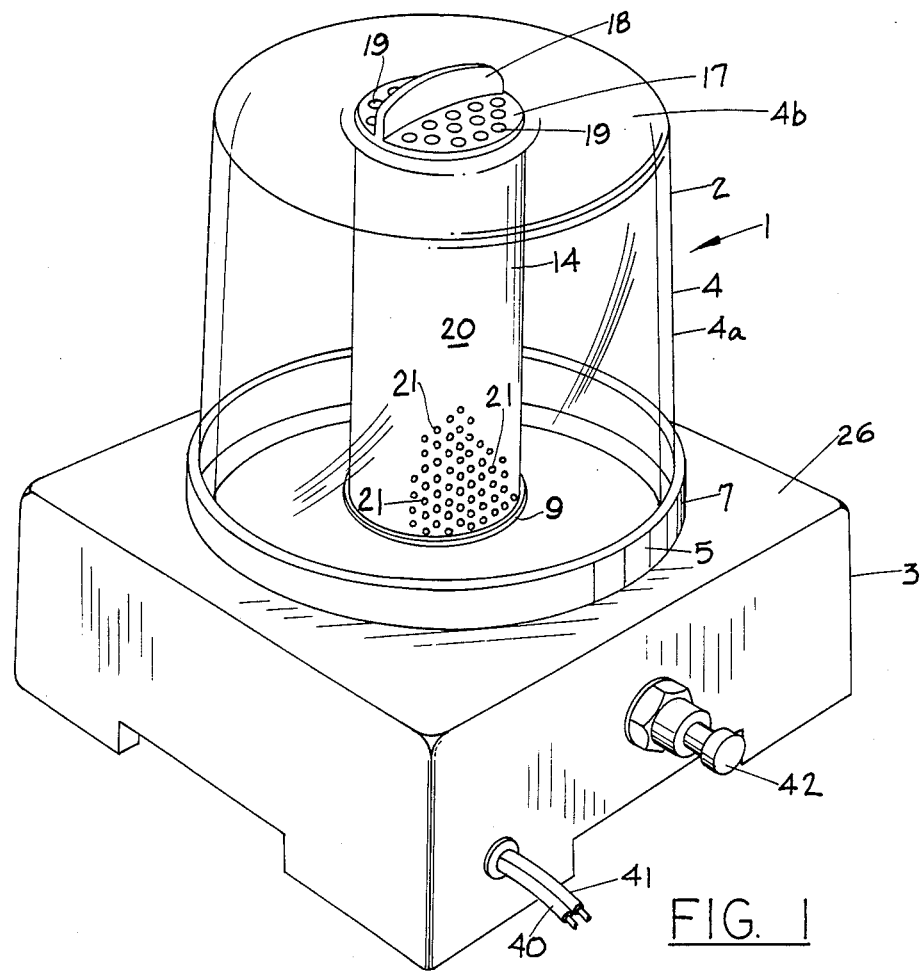
FIG. 1 is a perspective view of an exemplary embodiment of a gas and odor adsorbing unit of the present invention.
Figure 2:
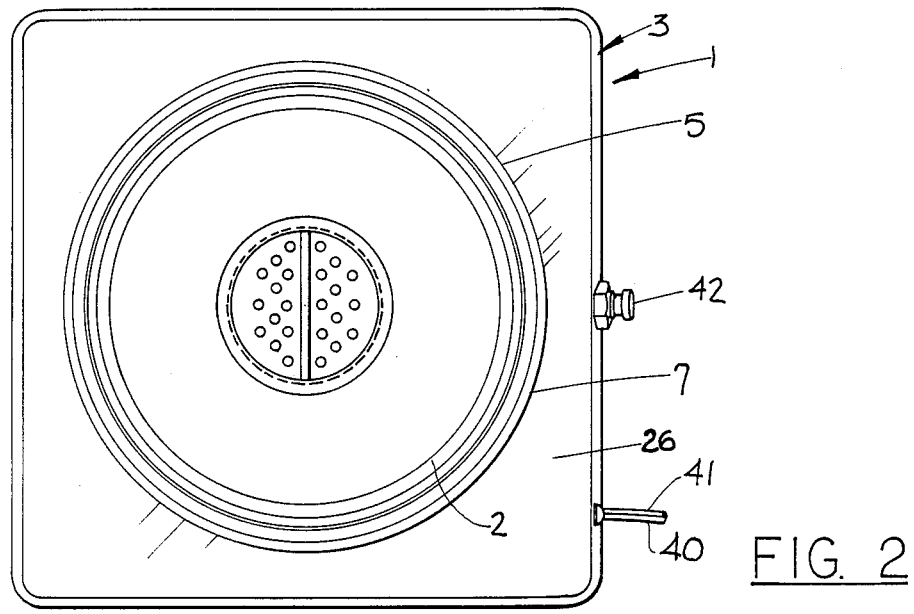
FIG. 2 is a plan view of the unit of FIG. 1.
Figure 3:
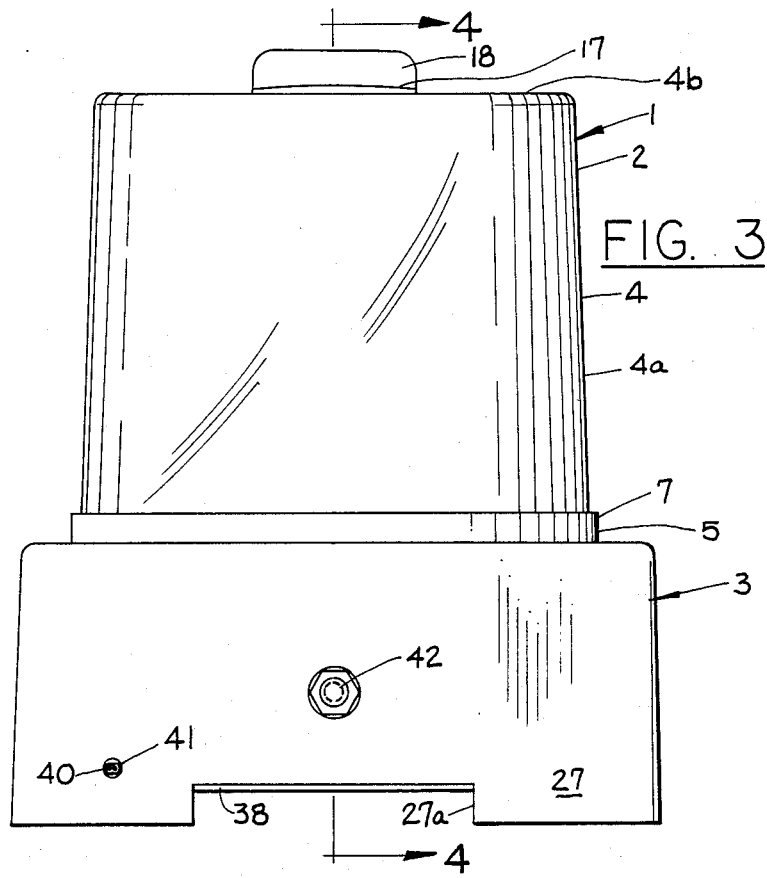
FIG. 3 is an elevational view of the unit of FIG. 1.
Figure 5:
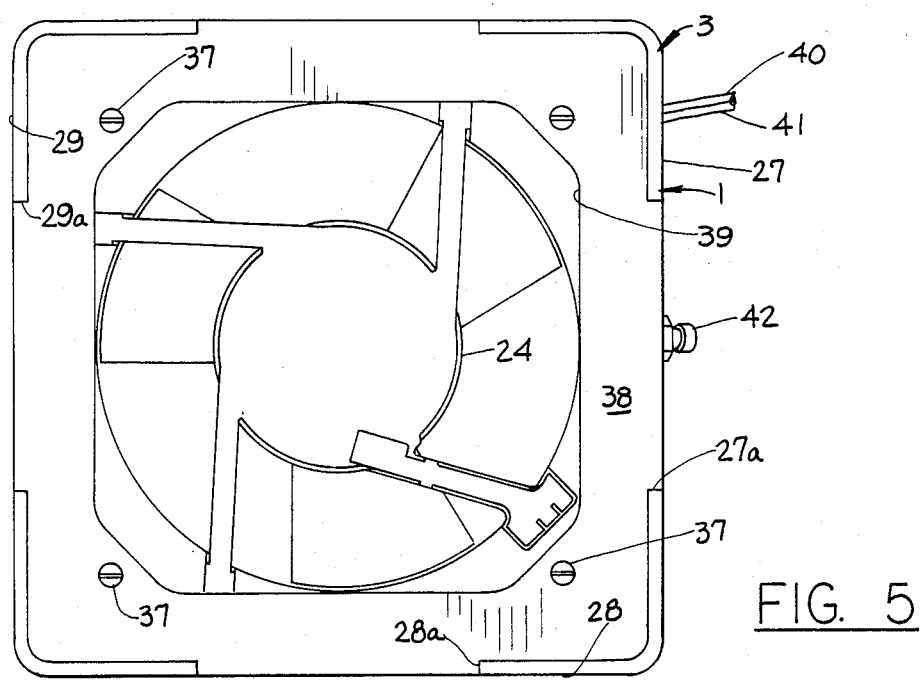
FIG. 5 is a bottom view of the unit of FIG. 1.

Unit 1 comprises a canister 2 and a base member 3. The canister 2 is best seen in FIGS. 1 and 4. Canister 2 comprises a main body portion 4 and a removable bottom 5. While the shape of canister 2 does not constitute a limitation of the present invention, for purposes of an exemplary showing, the main body portion 4 is illustrated as comprising a sidewall 4a of circular cross-section and a substantially planar top 4b. The top 4b may constitute an integral one-piece part of sidewall 4a. Sidewall 4a may have a slight upward and inward taper, if desired. The main body portion 4 is preferably made of transparent glass or transparent plastic.

The bottom end of main body portion 4 is open and is closable by removable bottom 5. To this end, sidewall 4a, near its lower end, is provided with a series of external threads 6. The substantially planar removable bottom 5 is provided with an upstanding peripheral flange 7 which is internally threaded as at 8. The threads 6 and 8 cooperate to removably attach bottom 5 to canister main body portion 4. It would be within the scope of the invention to substitute a snap fit engagement between the cannister bottom 5 and side wall 4a, instead of the above described threaded engagement. The bottom 5 is completed by the provision of an upstanding annular flange 9 on its inside surface and a plurality of perforations 10 extending through the bottom and located within the confines of annular flange 9. The purposes of annular flange 9 and perforations 10 will be described hereinafter.

The top portion 4b of canister 2 has a central opening 11 formed therein. On its inside surface, the top portion 4b has a downwardly depending, annular flange 12 which surrouhds the opening 11. The annular flange 12 has a groove 13 formed therein. The groove 13 is adapted to receive the upper end of a tubular member 14. The lower end of tubular member 14 is just nicely received within the confines of annular flange 9 of removable bottom 5.

The inside surface of annular flange 12 is threaded as at 12a. The threads 12a are adapted to cooperate with threads 15 formed on the exterior surface of a downwardly depending annular flange 16 constituting an integral, one-piece part of a cap 17. The cap 17 may be provided with an upstanding rib 18 by which it can be rotated for engagement and disengagement with the threads 12a. It will be noted that cap 17 is provided with a plurality of perforations 19, similar to perforations 10 in removable bottom 5. The purpose of perforations 19 will be apparent hereinafter.

The tubular member 14 is illustrated in FIGS. 1 and 4 as being cylindrical with a circular cross-section. While this is a preferred configuration, the tubular member 14 may have any appropriate cross-sectional configuration. The tubular member 14 is defined by a foraminous wall 20, the perforations of which are most clearly shown at 21 in FIG. 1. Tubular member 14 may be made of perforated metal, plastic, cardboard, paper or the like. The tubular member 14 may also be made of screen material.

The holes 21 in tubular member 14 preferably have a diameter of about 0.04 inch and the number of holes is such that at least half the surface of wall 20 is open.

The annular chamber defined by canister wall portion 4a, top portion 4b, tubular member 14 and removable bottom 5 is filled with molecular beads constituting a molecular sieve bed 22.

Since the gas and odor molecules to be removed from the ambient air will normally have a diameter falling within the range of 2 to 10 angstroms, the molecular sieve should be chosen to have beads with comparable pore sizes. Exemplary, but non-limiting molecular sieve beds are made of sodium or calcium aluminosilicate and are available in pore sizes of 2 angstroms, 3 angstroms, and up to 10 angstroms.

It is preferred that the molecular sieve bed 22 be of the general type taught in U.S. Pat. No. 3,705,480. In this patent it is taught that the molecular particles of the molecular sieve bed may have interspersed therein particles of a dew point indicating material. An exemplary, but non-limiting example of such dew point indicating material is silica gel coated with cobalt chloride. The dew point indicating particles or beads change color from blue to pink progressively, as the particles gradually attract and entrap moisture. Preferably, the blue gel indicator particles are interspersed indiscriminately or at random throughout the mass or bed of particles constituting the molecular sieve. The blue gel particles may constitute about 20% of the bed by volume. When distributed at random in the molecular sieve bed 22, the color change dew point indicating material furnishes a progressively continuous indication of the moisture content of the molecular sieve bed 22, until a point is reached wherein the bed 22 is considered to be spent, and requires replacement. It is for this reason that the main body portion 4 of canister 2 is preferably made of transparent material, so that the color change dew point indicating material can be observed.

Returning to FIG. 4, it will be apparent that the tubular member 14 defines a passage 23 through the molecular sieve bed 22. The passage 23 is connected to ambient atmosphere through perforations 10 in removable bottom 5 and perforations 19 in cap 17. Furthermore, the molecular sieve bed 22 is exposed to ambient atmosphere only at foraminous wall 20 of tubular member 14. The canister 2 may be designed and made to be disposable when the molecular sieve bed 22 therein is spent. Alternatively, the bottom 5 may be removed from canister 2 and the spent molecular sieve bed 22 is replaced by a fresh molecular sieve bed.

The embodiment of FIGS. 1–5 is intended to have ambient air forced through passage 23 by means of an electric fan unit, generally indicated at 24. The precise nature of fan unit 24 does not constitute a limitation of the present invention. Any appropriate, commercially available fan can be used. It has been found that excellent results are achieved using a fan having the capacity of moving from about 2 to about 5 cubic feet of air per minute.

In the embodiment of FIGS. 1–6, the canister is mounted upon a base member, generally indicated at 3. While base member 3 may have any appropriate configuration and may be made of any appropriate material, for purposes of an exemplary showing it is illustrated as being molded of plastic with a substantially planar top 26 and planar sides 27 through 30. Each of the sides 27 through 30 is provided with a notch in its lower edge, as indicated at 27a through 30a, respectively. Notches 27a through 30a permit circulation of air within base 3.

The base top 26 is provided with a downwardly depending annular wall portion 31 terminating in an annular shoulder 32. The annular shoulder 32, in turn, terminates in a downwardly depending wall 33 which defines a circular opening 34 in the base top 26. The annular wall 31 and shoulder 32 are so sized as to just nicely receive the removable bottom 5 of canister 2, as is shown in FIGS. 1 and 4.

The underside of shoulder 32 carries a series of four downwardly depending lugs 35, each provided with a threaded bore 36. The threaded bores 36 of the four lugs 35 are adapted to receive mounting bolts 37, by which the electric fan unit 24 is affixed to base 3. The mounting bolts 37 also support a bottom plate 38 for base 3. The bottom plate 38 is provided with a large central opening 39 exposing the majority of fan unit 24.

In the embodiment illustrated, the fan unit 24 is adapted to draw air through perforations 19 in cap 17, passage 23, perforations 10 in removable canister bottom 5 and into the interior of base 25. The fan unit 24 returns this air to the exterior of the unit through the notches 28a through 30a of the base. It will be understood by one skilled in the art that it is within the scope of the invention to provide a fan unit which will circulate the air in the opposite direction to that just described. The electric fan unit 24 is connected to a source of current by lines 40 and 41, fragmentarily shown in FIGS. 1, 2, 4 and 5. Lines 40 and 41 may terminate in a conventional plug to be engaged in a wall outlet or the like. One of the lines 40 and 41 will contain an on-off switch. Such a switch is shown at 42 in FIGS. 1-5, in the form of a conventional push button switch. It would be within the scope of the invention to substitute a timer switch, such as a dial type manual-set timer switch, for switch 42.

The embodiment of FIGS. 1-5 having been described in detail, its operation can now be set forth. As indicated above, the molecular sieve bed 22 has an affinity for gases, odors and moisture. If ambient air to be filtered is simply drawn through the molecular sieve bed directly, it has been found that moisture will collect on the surfaces of the molecular sieve beads and ultimately will penetrate the pores of the beads, reducing the number of gas and odor molecules which can be trapped in the pores of the molecular sieve beads. It has been discovered, however, that with the provision of passage 23 through the molecular sieve bed 22, less moisture and more gas and odor molecules are adsorbed by the bed. This greatly increases the working life of the molecular sieve bed 22 from the standpoint of adsorption of gases and odors.

Since some moisture adsorption is unavoidable, the color change dew point indicating material within the bed will still serve as an adequate visual indication of when the bed is spent. Since the molecular sieve bed 22 is exposed to only that portion of the ambient air being drawn through passage 23, by virtue of foraminous wall 20, bed saturation will occur adjacent foraminous wall 20 first, and thereafter will work its way slowly toward canister wall portion 4a. Thus, when the color change dew point indicating beads adjacent canister wall portion 4a change from blue to pink, this is a good indication that the entire bed 22 is saturated and should be replaced.

Under some circumstances, the location of diffusing means in the passage 23 will slow down and disperse the air being drawn therethrough, increasing the chances of the small gas or odor molecules passing through the perforations in passage wall 20 and into the molecular sieve bed 22. Polyester or fiberglass filter material, can be used for this purpose. The use of baffles within passage 23 will also serve this purpose. The amount of air flowing through passage 23 can also be controlled by properly sizing perforations 19 and 10.

The size of the unit 1 and its molecular sieve bed can be varied, according to the size of the room or space, the ambient air of which is to be filtered.

It has been found that adequate filtering can be achieved in a typical room when the canister is sized to contain about one quart of molecular sieve bed particles per 400 square feet of floor space. A molecular sieve bed, so sized, will remain effective for about 1 and ½ weeks with the electric fan assembly 24 running.

It has further been found that when the fan unit 24 is turned off, the unit 1 will continue to operate as a static gas and odor adsorber, the molecular sieve bed continuing to attract gas and lingering odor molecules from the ambient air. The ambient air will tend to move upwardly through passage 23 by virtue of the flue effect. Under these circumstances, adsorption is slower, but the effectiveness of the molecular sieve bed will last some ten times longer.

If the ambient air is filled with foreign material, or in order to retain a diffusing medium within passage 23, it is sometimes desirable to locate a disk of filter paper at one or both ends of passage 23. For such purposes, a 50 micron particle filter has been found adequate.

When a filter sheet is to be located at the upper end of passage 23, a properly cut filter disk 43 (see FIG. 4) can be located on and supported by an annular lip 44 formed on the annular lug 12. If a similar filter disk is to be located at the bottom of passage 23, it can simply be laid upon that portion of the inside surface of removable bottom 5 located within the confines of tubular wall 20.

The embodiment of FIGS. 1-5 is a dynamic embodiment, in that the fan unit 24 causes air to pass through passage 23. As indicated above, even when the fan unit 24 is turned off, the unit 1 will continue to function as a gas and odor adsorber in a static fashion, i.e., without mechanically induced air movement. Adsorption of gases and odors, under these circumstances, is slower. Nevertheless, the provision of a passage through the molecular sieve bed continues to reduce moisture pickup, thus extending the working life of the bed with respect to adsorption of gases and odors.

Reference is now made to FIGS. 6, 7, and 8, wherein a static adsorber, involving the principles of the present invention, is shown. The adsorber is generally indicated at 45. The adsorber comprises a vessel or canister 46, preferably made of transparent glass or plastic. While not required, the canister is illustrated as being of cylindrical configuration and having a neck portion 47 of lesser diameter, so as to form an annular shoulder 48. The exterior surface of neck portion 47 is threaded.

A cap 49 is provided, having a substantially planar upper surface 50 and a downwardly depending skirt portion 51. The inside surface of skirt portion 51 is threaded so as to cooperate with the threads of the neck portion 47 of the canister, with the result that the cap 49 is removably affixable to the canister 46. The assembly may be provided with a mounting bracket 52. The mounting bracket 52 has a circular opening 53 formed therein, so as to just nicely receive the neck portion 47 of canister 46. When the cap 49 is affixed to canister 46, the mounting bracket 52 is trapped between the canister shoulder 48 and the bottom edge of the downwardly depending skirt 51 of cap 49.

The adsorber 45 of FIGS. 6-8 is provided with a foraminous tubular member 54 similar to the foraminous tubular member 14 of the embodiment of FIGS. 1-5. As is shown in FIG. 8, the bottom of canister 46 may be provided with a central perforation 55 through which the end of foraminous tubular member 54 extends. The amount by which the foraminous tubular member 54 extends through perforation 55 is determined by an annular rib 56 formed on the tubular member 54 which abuts the bottom of canister 46. The upper end of tubular member 54 is engaged within an annular rib 57 formed on the inside surface of cap 49. A plurality of holes 58 are formed in the cap 49 within the area encircled by annular rib 57. Thus, it will be apparent that tubular member 54 is open to the ambient atmosphere at both of its ends.

The tubular member 54 may be made of any of the materials and in any of the ways described with respect to tubular member 14 of FIG. 4. The tubular member 54 is surrounded by a molecular sieve bed which may be identical to bed 22 of FIG. 4 and preferably contains the color change dew point indicating beads as described above. If desired, the tubular member 54 may be provided with diffusion means of the same type and in the same manner described above. One or both ends of tubular member 54 may be provided with a filter paper disk (not shown), as described above. Such a disk at the upper end of tubular member 54 can simply be trapped and held between the upper end of the tubular member and the adjacent portion of cap 49. At the lower end of tubular member 54, some appropriate form of retaining means (not shown) would have to be provided for the filter disk, as for example, a cap similar to cap 17 of FIG. 4. Alternatively, both ends of the tubular member could be open. For example, a single large opening could be substituted for the openings 58 in cap 45.

The operation of the embodiment of FIGS. 6-8 is identical to that described with respect to the embodiment of FIGS. 1-5 with the exception that the embodiment of FIGS. 6-8 relies solely on the flue effect for movement of ambient air through tubular member 54. It will be understood that adsorption of gases and odors will be slower with the unit of FIGS. 6-8 but the working life of the molecular sieve bed will be considerably longer than with a dynamic unit.

Figure 9:
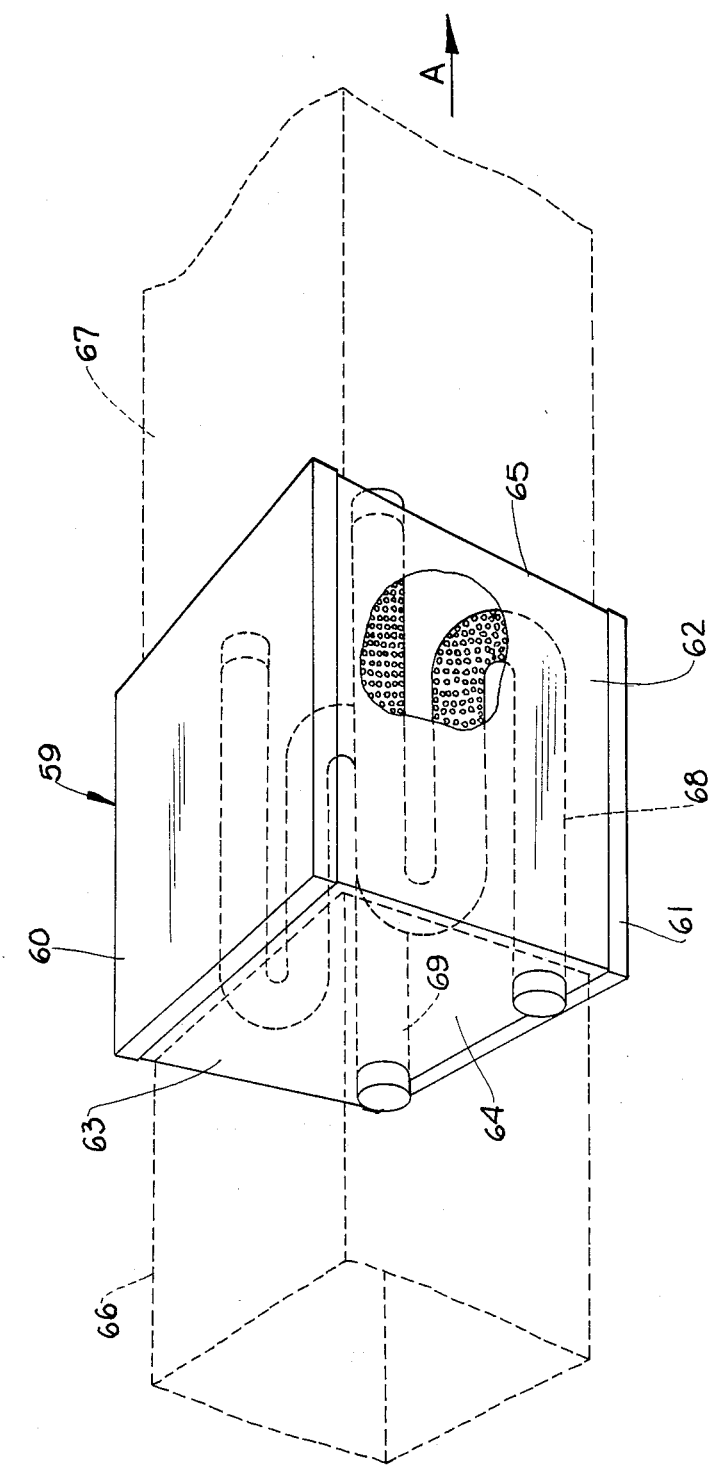
FIG. 9 is a fragmentary perspective view of yet another embodiment of the present invention.

Yet another embodiment of the present invention is illustrated in FIG. 9. In FIG. 9, the adsorber unit is generally indicated at 59. The adsorber unit 59 comprises a rectangular canister having a top 60, a bottom 61, sides 62 and 63 and ends 64 and 65. In this embodiment both the top 60 and the bottom 61 are removable members.

The entire canister may be made of transparent plastic material or the like. It is desirable that at least sides 62 and 63 be made of transparent material since the unit will use the same type of molecular sieve bed described with respect to the previous embodiments, having a quantity of color change dew point indicating material mixed therein. The molecular sieve bed completely fills the canister. By making at least sides 62 and 63 of transparent material, the molecular sieve bed can be visually inspected to determine when it has become saturated and requires replacement.

The unit 59 is located between and is affixed end-to-end to segments 66 and 67 (shown in broken lines) of a heating and/or air conditioning duct. The unit 59 has a plurality of foraminous tubular members extending from end 64 through end 65 of unit 59. The number of foraminous tubular members does not constitute a limitation of the present invention. For purposes of clarity, two foraminous tubular members are shown in broken lines at 68 and 69. While the tubular members 68 and 69 may be rectalinear in configuration, they can also be of sinuous configuration, as shown in FIG. 9. This enables the unit 59 to be shorter from end wall 64 to end wall 65. Again, the foraminous tubular member 68 and 69 can be made of the same materials and in the same manner decribed with respect to the embodiment of FIGS. 1-6. Diffuser means may also be located within the tubular members, if desired.

It will be evident that this is a dynamic application of the adsorber of the present invention. In this instance, movement of air through the unit 59 and in the direction of arrow A is caused by the furnace fan. Use of the embodiment of FIG. 9 could be most advantageous to those suffering from allergies and the like.

When the blue indicator beads of the molecular sieve bed, located near sidewalls 62 and 63, turn from blue to pink, it is evident that the molecular sieve bed is saturated and should be replaced. By removal of bottom 61, the old bed can be discharged from unit 59. Thereafter, the bottom 61 is replaced and the top 60 is removed so that the unit 59 can be filled with a fresh molecular sieve bed.

Again, it will be appreciated that the provision of foraminous tubular members 68 and 69 will provide the same advantage found in the embodiments of FIGS. 1-8. Most of the moisture in the air passing through duct 66/67 will remain in the moving air, while gases and odors will be removed by the molecular sieve bed.

It would be within the scope of the invention to so size unit 59 that it could be removably located within a furnace and/or air conditioning duct, substantially filling the cross section of the duct. To replace the molecular sieve bed, the unit 59 would be removed from the duct by means of a door or removable panel in the duct.

Figure 10:
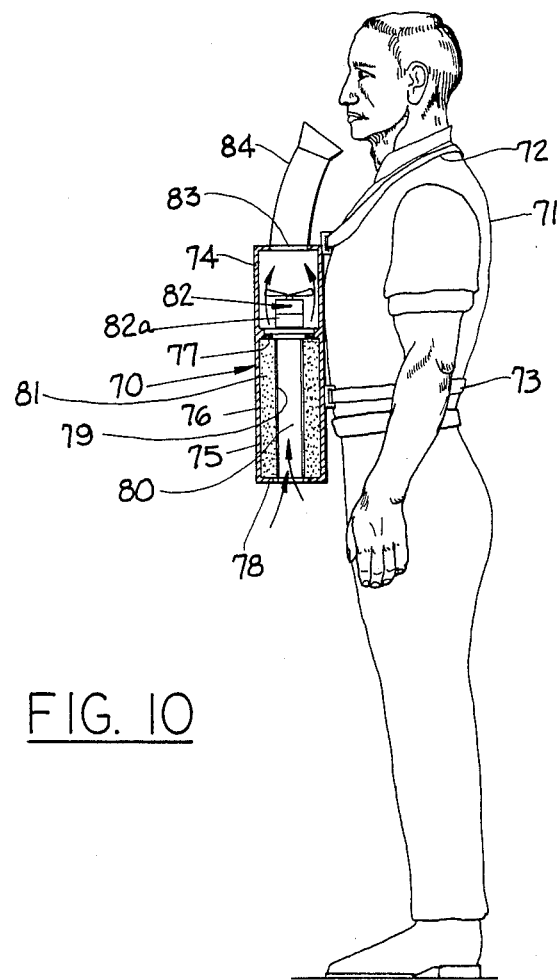
FIG. 10 is a side elevational view, partly in cross section, of a portable embodiment of the present invention mounted on the user.

Reference is now made to FIG. 10, wherein a portable version of the gas and odor adsorbing unit of the present invention is illustrated. The unit is generally indicated at 70, and is affixed to the body of the user 71 in any appropriate manner, as for example, by adjustable straps 72 and 73.

The unit 70 comprises an upper housing portion 74 and a lower cannister portion 75. The cannister portion 75 can be similar to that illustrated in FIGS. 1 through 6. Cannister portion 75 comprises a side wall 76, a top 77 and a bottom 78. A foraminous tubular member 79 defines an air passage 80 through the cannister portion. A molecular sieve bed 81 fills the space between tubular member 79, side wall 76, top 77 and bottom 78. Again, the molecular sieve bed may contain color change dew point indicating beads, as described above. When this is the case, the cannister portion 75 is preferably made of transparent plastic or the like. The upper and lower ends of tubular member 79 may be open, or they may be provided with cover members (not shown) provided with perforations. Such cover members may be provided to retain diffusion means within tubular member 79, or to determine the amount of air passing through tubular member 79, if desired. The tubular member 79 could also be provided with baffle means, as described with respect to FIGS. 1 through 6.

The cannister portion 76 is detachably affixed to the bottom of housing portion 74 in any appropriate way including clamp means, a threaded engagement, a snap fit, or the like.

The housing portion 74 contains a small electric fan unit, generally indicated at 82. The electric fan unit 82 may be powered by any appropriate power source 82a such as batteries or a rechargeable power source.

The upper end of housing portion 74 is provided with an opening 83 to which a duct member 84 is connected. In this way, air drawn through the cannister portion 76 by fan unit 82 is directed toward the nose and mouth of the user 71.

The unit 70 could be advantageously employed by one working in adverse atmospheric conditions, or one suffering from respiratory problems or allergies. The duct 84 is preferably made flexible and adjustable. Alternatively, the duct 84 could be replaced by a face mask. While the unit 70 is shown mounted on the user's chest, with appropriate modifications to the duct 84, or with the use of a face mask, the unit could be affixed to the user's back so as to be out of the way, if the user is required to perform various manipulations.

The positions of the housing portion 74 and cannister portion 76 could be reversed. In this instance the cannister portion would be located above the housing portion 74 and the duct 84 or face mask would be attached to the upper end of the cannister portion. Fan unit 82 would push air through tubular member 79, rather than draw air therethrough.

In all of the embodiments taught herein, a molecular sieve bed can be used which does not contain color change dew point indicating material. Under these circumstances, the cannister portion 76 need not be made of transparent material, and the molecular sieve bed should be replaced at predetermined intervals.

Modifications may be made in the invention without departing from the spirit of it.

What is claimed is:

1. An adsorber for removing gasses and odors from the ambient atmosphere, said adsorber comprising a cannister containing a bed of molecular beads constituting a molecular sieve, at least one tubular passage extending through said molecular sieve and being connected to the ambient atmosphere at opposite ends of said cannister, said passage being defined by a peripheral foraminous wall, said molecular sieve being exposed to said ambient atmosphere only at said foraminous wall and means to cause a flow of said ambient atmosphere to pass through said tubular passage, whereby gasses, odors and a minimum of moisture is adsorbed by said molecular sieve from said ambient atmosphere passing through said passage.

2. The adsorber claimed in claim 1 wherein said passage is substantially vertically oriented and ambient atmosphere passes therethrough by the flue effect 3. The adsorber claimed in claim 1 wherein said means to cause a flow of ambient atmosphere through said passage comprises a fan arranged to blow ambient atmosphere through said passage.

4. The adsorber claimed in claim 1 wherein said means to cause a flow of ambient atmosphere through said passage comprises a fan arranged to draw ambient atmosphere through said passage.

5. The adsorber claimed in claim 1 wherein the holes in said foraminous wall are of a diameter of at least about 0.04 inch and of such number that at least one half the surface of said wall is open.

6. The adsorber claimed in claim 1 wherein said foraminous wall comprises openwork screen material.

7. The adsorber claimed in claim 1 wherein said foraminous wall forms a tubular passage of circular cross section.

8. The adsorber claimed in claim 1 wherein the beads of said molecular sieve bed have a pour size in the range of from about 2 angstroms to about 10 angstroms.

9. The adsorber claimed in claim 1 wherein said molecular sieve bed contains particles of color change dew point indicating material and said cannister has a transparent exterior portion through which said molecular sieve bed can be observed.

10. The adsorber claimed in claim 1 including means within said passage to slow down and disperse said air passing therethrough.

11. The adsorber claimed in claim 1 including a layer of filter material extending across at least one end of said passage.

12. The adsorber claimed in claim 1 comprising a portable unit to be mounted on the person of a user, and means to direct air from said passage toward at least one of said user's nose and mouth.

13. The adsorber claimed in claim 1 wherein said cannister is associated with an air duct, said cannister being so positioned that air passing through said duct passes through said at least one passage.

14. The adsorber claimed in claim 1 wherein said adsorber includes a housing, said cannister being removably attachable to said housing with one end of said cannister passage leading to the interior of said housing, a fan unit located within said housing to direct said ambient air through said passage.

15. The adsorber claimed in claim 2 wherein said molecular sieve bed contains particles of color change dew point indicating material and said cannister has a transparent exterior portion through which said molecular sieve bed can be observed.

16. The adsorber claimed in claim 14 wherein said molecular sieve bed contains particles of color change dew point indicating material and said cannister has a transparent exterior portion through which said molecular sieve bed can be observed.

17. The adsorber claimed in claim 16 including means within said passage to slow down and disperse said air passing therethrough.

* * * * *

UNITED STATES PATENT AND TRADEMARK OFFICE
CERTIFICATE OF CORRECTION

PATENT NO. : 4,875,914
DATED : October 24, 1989
INVENTOR(S) : Wallace Wireman

It is certified that error appears in the above-identified patent and that said Letters Patent is hereby corrected as shown below:

In the Abstract:

Col. 1, line 3: "absorbing" should be -- adsorbing --.

Col. 2, line 13, "odord" should be -- odors --.

In the Disclosure:

Col. 2, line 60: "fagmentary" should be -- fragmentary --.

In the Detailed Description:

Col. 3, line 42: "surrouhds" should be -- surrounds --.

Signed and Sealed this

Fifteenth Day of January, 1991

Attest:

HARRY F. MANBECK, JR.

*Attesting Officer*   *Commissioner of Patents and Trademarks*